Sept. 19, 1950  W. A. MILLER  2,522,957
TRIANGULAR SIGNAL GENERATOR
Original Filed June 27, 1942  4 Sheets-Sheet 1

INVENTOR
William A. Miller
BY H. S. Grover,
ATTORNEY

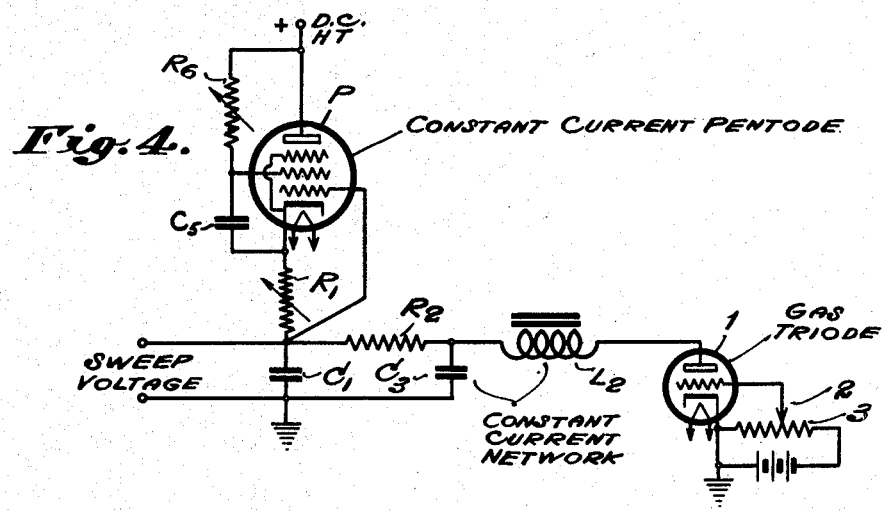
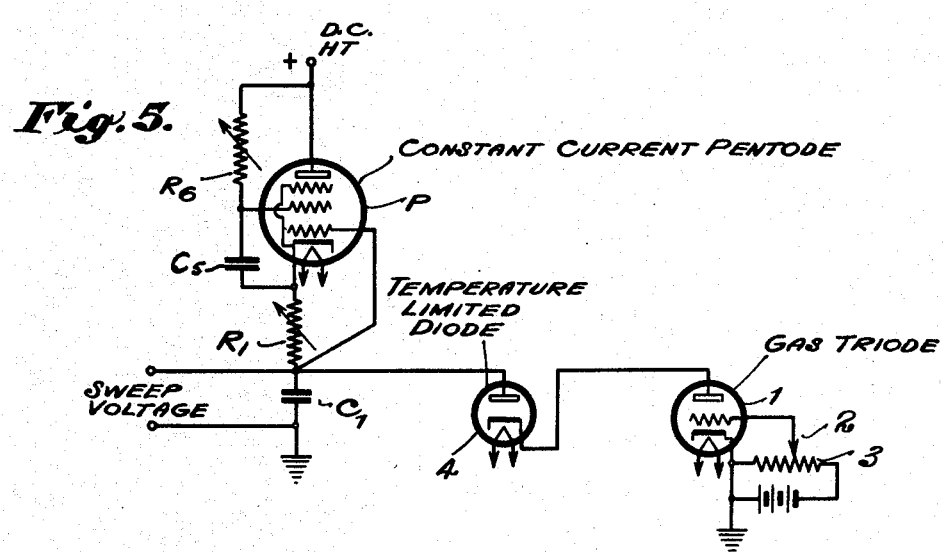
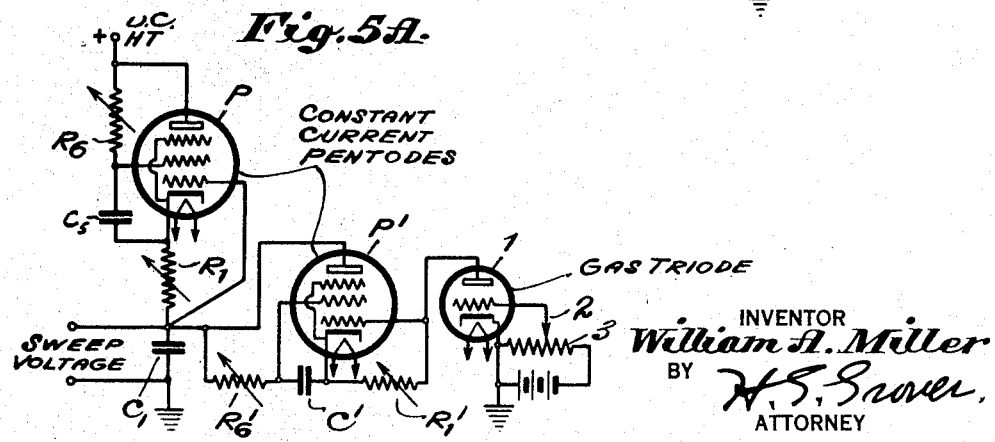

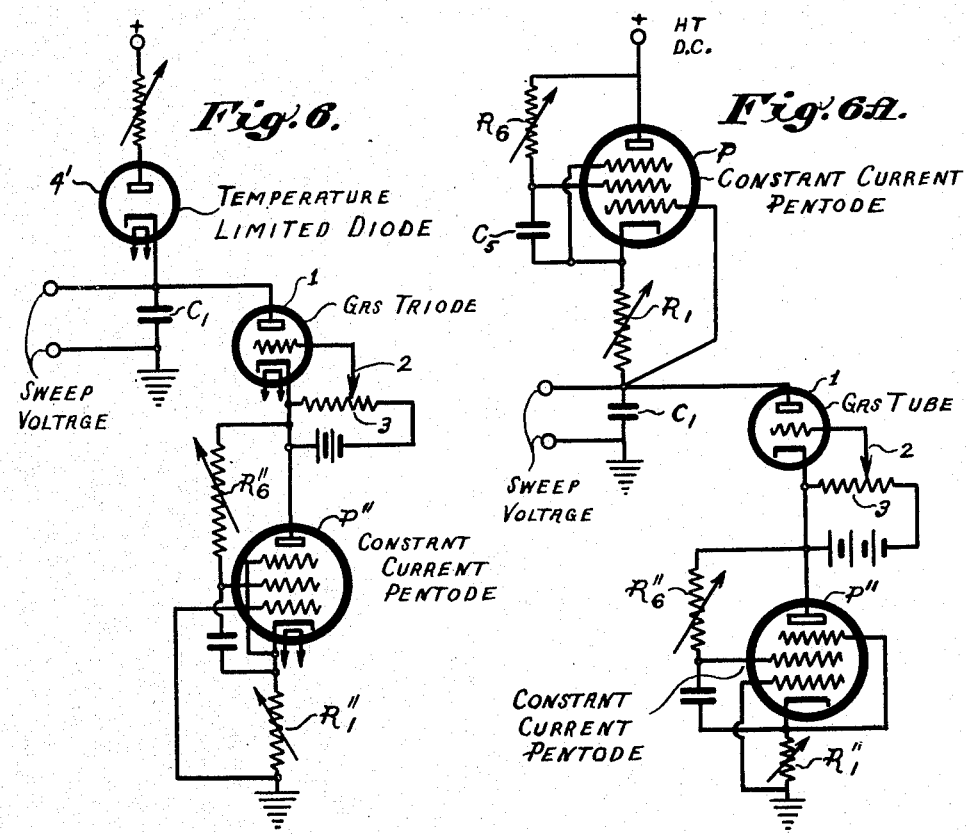

Sept. 19, 1950 W. A. MILLER 2,522,957
TRIANGULAR SIGNAL GENERATOR
Original Filed June 27, 1942 4 Sheets-Sheet 4

INVENTOR
William A. Miller
BY H. S. Grover,
ATTORNEY

Patented Sept. 19, 1950

2,522,957

UNITED STATES PATENT OFFICE 2,522,957

TRIANGULAR SIGNAL GENERATOR

William A. Miller, Port Jefferson Station, N. Y., assignor to Radio Corporation of America, a corporation of Delaware Original application June 27, 1942, Serial No. 448,804. Divided and this application February 6, 1946, Serial No. 645,911

1 Claim. (Cl. 250—27)

The present invention relates to signal generators and more particularly, although not necessarily exclusively, to generators of alternating currents or pulses of triangular form. The invention is applicable to the production of voltage waves or pulses and current waves or pulses flowing as a result of voltages generated in accordance with the invention. The form of the produced waves or pulses is triangular. This invention is a division of my co-pending application, Serial No. 448,804, which was filed June 27, 1942, now Patent No. 2,413,063, granted December 24, 1946.

One object of the present invention is to provide a generator of triangular waves or triangular pulses, in which a desired degree of control can be given to either slope of the triangular wave.

Another object is to provide an improved generator of triangular pulses which repeat themselves at specified and controlled intervals of time, but which pulses occupy a time interval less than or small compared to the repetition rate.

A further object is to provide a generator of triangular waves or pulses, utilizing constant current devices both for charging and discharging a charge storing element.

A still further object is to provide a generator of triangular waves or pulses, in which the return slope of the wave or pulse is delayed over a desired interval of time.

Signal generators embodying features of the invention are especially useful in a cathode ray oscilloscope system which enables the signal to be measured to appear on the forward trace of the sweep, and the index or timing mark to appear on the return trace of the sweep, without the need of switching devices.

Figure 1:
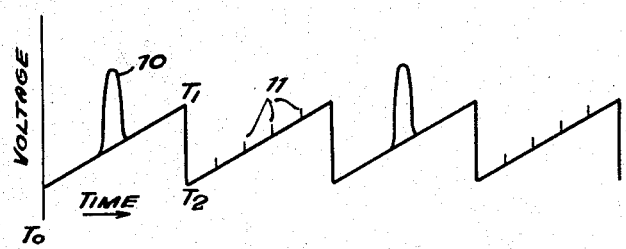
Figure 2:
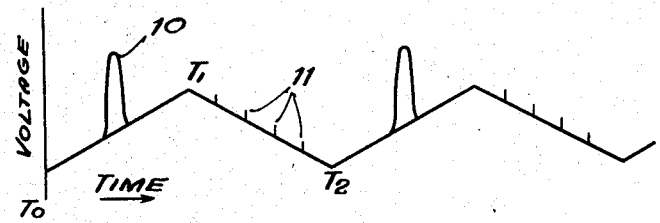
Figure 2A:
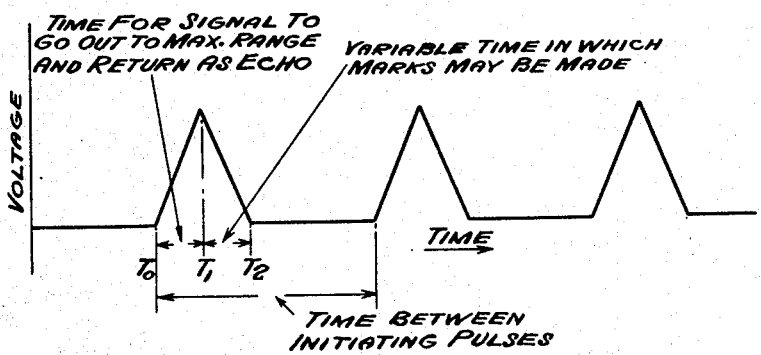
Figure 8:
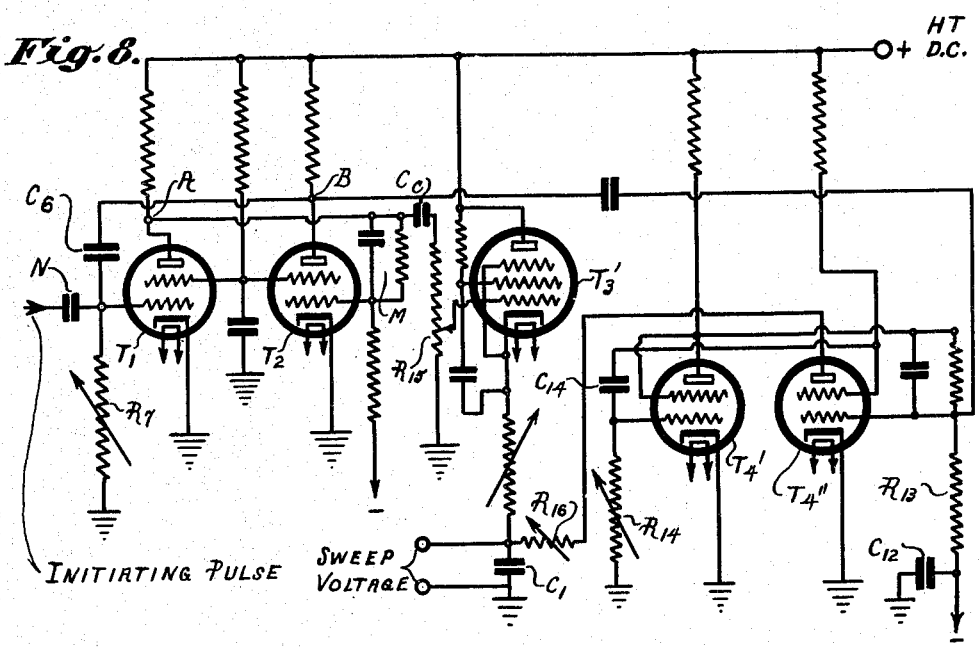
Figure 9:
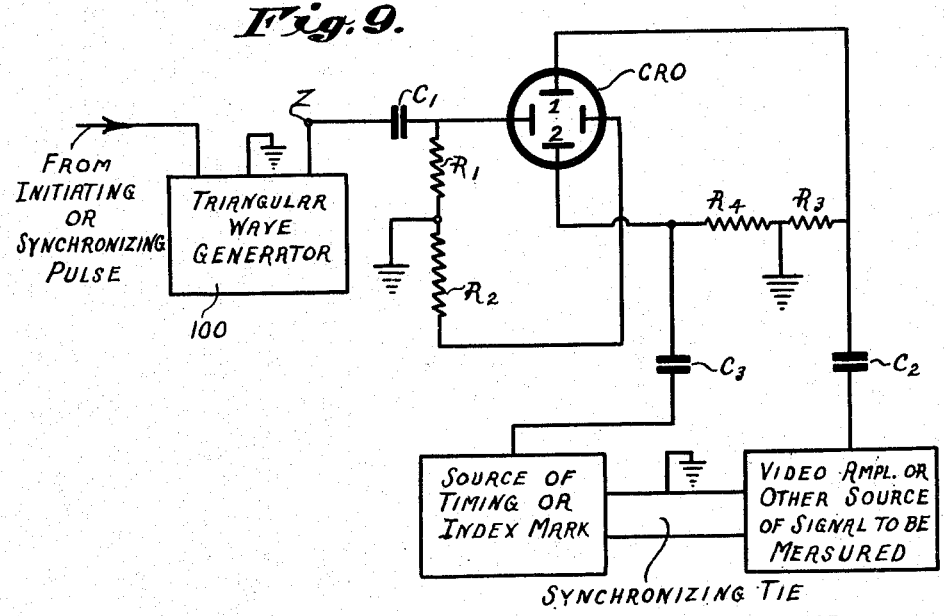

Other and more specific objects of the invention will become apparent and suggest themselves to those skilled in the art to which the invention is directed upon reading the following specification and claim in connection with the drawings in which:

Fig. 1 graphically illustrates known practice involving the use of a sawtooth wave form applied to a cathode ray oscilloscope for measuring purposes;

Fig. 2 graphically illustrates the use of a triangular wave with a delayed return slope for application to a cathode ray oscilloscope;

Fig. 2a graphically illustrates a series of triangular pulses which are produced by several generators of the present invention, which pulses can be made to repeat themselves at specified and controlled intervals of time;

Figs. 3, 4, 5, 5a, 6 and 6a show several embodiments of generator circuits in accordance with the invention, for producing triangular waves of the kind illustrated in Fig. 2;

Figs. 7 and 8 show generator circuits in accordance with two other embodiments of the present invention, for producing triangular pulses of the kind illustrated in Fig. 2a; and Fig. 9 illustrates, schematically, a simple circuit arrangement useful in radio locating systems for applying the signal pulse to be measured to the signal plates of an oscilloscope during the forward trace of the sweep and the index or timing marks to the same signal plates during return trace of the sweep.

Heretofore, in using cathode ray oscilloscopes as measuring or indicating instruments, it has been customary to impress timing or index marks or other signals on the trace of the cathode ray beam. According to known practice, this has been accomplished by applying a sawtooth wave to the horizontal deflecting plates of the oscilloscope, and then alternately impressing the signal to be measured and the index or timing mark on the forward trace of the cathode ray beam. To achieve the alternate application of the signal and the index mark to the forward trace of the cathode ray oscilloscope, there have been employed mechanical or electronic switching devices. Fig. 1 illustrates graphically known practice, wherein a sawtooth wave of the type shown in this figure is applied to the horizontal deflecting plates of the cathode ray oscilloscope, while the signal to be measured or under observation, herein indicated as a pulse 10, is applied to the signal deflection plates for observation on the forward trace of the beam, while the index or timing marks, herein represented as 11, are applied to the same signal deflection plates for observation on the next forward trace of the cathode ray beam. The sawtooth wave, as is well known, allows the cathode ray beam to be deflected at a uniform rate over the surface of the screen of the oscilloscope, during the time $T_0$ and $T_1$, after which the spot is rapidly returned to its original position during the time $T_1$ and $T_2$. This latter time is ordinarily made to be as short as possible consistent with stability. Actually, the sawtooth wave of Fig. 1 represents the voltage usually on the horizontal sweep plates, the cathode ray trace being only a horizontal line on the oscilloscope. The two voltages, i. e., the signal to be measured and the index or timing marks, both of which are to be observed, are impressed according to known practice alternately on the same signal deflection plates of the tube by means of some mechanical or electronic switching device. One difficulty with this known practice is that the switches, both mechanical and electrical, are complicated, and the mechanical switch requires synchronization to prevent accidental chopping. The electronic switch, furthermore, requires a great number of tubes and several channels, in addition to also requiring synchronization.

The invention claimed in my copending application, Serial No. 448,804 referred to above, overcomes the foregoing difficulty by eliminating the need for switching arrangements in applying the signal to be measured and the timing marks on the oscilloscope. According to one feature of the invention claimed in the previously mentioned copending application, it is proposed to delay the return time or slope of the sawtooth wave, in order to form a triangular wave of the type shown in Fig. 2, for applying a voltage on the horizontal sweep plates of the oscilloscope, as a result of which the signal to be observed can be applied to the vertical signal plates, while the cathode ray beam is moving in one direction (the forward trace, for example), and the index or timing marks applied to the same vertical signal plates, while the cathode ray spot is moving in the opposite direction (return trace). Thus, if the triangular wave of Fig. 2 represents the voltage which applicant applies to the sweep plates of the oscilloscope, the signal pulse to be observed (herein labeleld 10) will appear on the surface of the oscilloscope screen during the time $T_0$ and $T_1$, while the index or marking pulses 11 will appear on the surface of the oscilloscope screen during the time $T_1$ and $T_2$. As mentioned above, in practice the trace appears only as a horizontal line on the oscilloscope, although the triangular shape of the sweep voltage curve represents the voltage curve of the wave applied to the sweep plates. It will be understood, of course, that although sweep plates only have been mentioned, presupposing the use of an electrostatic deflection type of oscilloscope, it should be understood that the methods mentioned above are applicable to magnetic deflection oscilloscope tubes using deflecting coils instead of plates. A simple circuit for achieving the results graphically shown in Fig. 2 is schematically illustrated by way of example in Fig. 9 described later.

A triangular wave impressed upon the sweep plates of a cathode ray oscilloscope measuring or indicating instrument is useful in the radio locating field. Such a wave may be readily produced in accordance with the present invention. For example, in the radio locators commonly employed for military purposes, the pulse is sent out by the transmitter and reflected from the object to be detected, which might be an airplane or a ship. This reflected pulse will appear on the forward trace of the oscilloscope sweep, while the index markings will appear on the returning trace of the oscilloscope sweep. The time of the trace of the sweep wave from the beginning of the trace (started by an outgoing pulse) to the peak of the sweep voltage, corresponding to the furthest distance of the trace on the oscilloscope before the trace returns, is made to be slightly greater than the time for a pulse to reach an object in the greatest distance range to be observed and then return as an echo or reflected pulse. Due to the persistence of vision, the reflected pulses and index marks will both appear to the eye on the oscilloscope screen at the same time. By lining up one of the index marks, by means of a dial, for example, with any one echo or pulse mark to be identified, and then observing the distance on the trace between the point of origin of the ray spot and the position of the index mark under the echo mark to be identified, there is obtained an indication of the range or distance to the object detected. The dial for lining up the index mark with any of the pulse marks to be identified may control a rheostat or a potentiometer applying potential to a tube, and may be suitably calibrated to read the distance. For a more detailed understanding of the principles of the radio locating system generally referred to above, reference is made to copending Hansell application Serial No. 427,266, filed January 19, 1942, now Patent No. 2,455,673, granted December 7, 1948, and a copending Lindenblad application Serial No. 441,311, filed May 1, 1942, now Patent No. 2,411,410, granted November 12, 1946.

Fig. 2a illustrates another type of triangular wave herein shown as triangular pulses separated from one another which can be effectively produced in accordance with the present invention. The triangular pulses of Fig. 2a repeat themselves at specified and controlled intervals of time, and the pulses occupy a time interval less than or small compared to the repetition rate. When using the triangular pulses of the type shown in Fig. 2a, the time interval $T_0$ to $T_1$ may, for example, correspond to the time it takes for a signal of a radio locating system, when such pulses are applied to such a system, to go out to the maximum distance range to be observed and then return as an echo. This presupposes, of course, that there is an object in this distance range to be detected, in order to reflect a wave to produce a reflection or echo pulse. The time $T_1$ to $T_2$ is a variable time, which can be controlled in accordance with the invention, in which the index or timing marks may be made by suitable circuits. The time between the beginning of any two adjacent triangular pulses represents the time between the initiating pulses. The several embodiments for producing waves or pulses of the type shown in Fig. 2a, will be described later in connection with the generator circuits of Figs. 7 and 8.

The different generator circuits of the present invention for producing triangular waves of the type shown in Fig. 2 will now be described: Such generator circuits are shown in Figs. 3, 4, 5, 5a, 6 and 6a.

Figure 3:
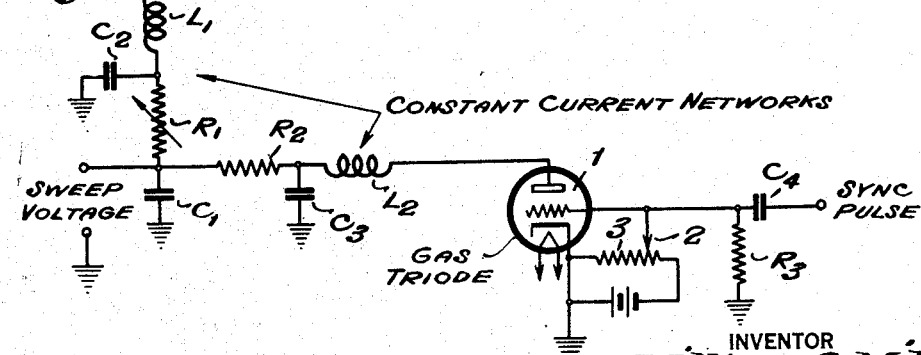

Fig. 3 shows a simple circuit for producing triangular wave of Fig. 2. In this system the circuits $L_1$, $C_2$ and $L_2$, $C_3$ comprise constant current networks. The condenser $C_1$ and the series circuit $R_2$, $C_3$ are charged by current flowing through $L_1$ and $R_1$ from a source of positive high direct current voltage HT. The values of $C_2$ and $L_1$ are so chosen that for the particular frequency desired, a constant current flows in the condenser $C_1$, so that the voltage across the terminals of $C_1$ increases linearly with time. Putting it in other words, the magnitude of current which flows in $C_1$, $R_2$, and $C_3$ is determined by the values of $L_1$, $C_2$ and $L_2$, $C_3$. The resistors $R_1$ and $R_2$ serve to present reaction between the two constant current networks $L_1$, $C_2$ and $C_3$, $L_2$. These constant current networks are resonant to the particular frequency of the sweep desired on the deflection plates of the oscilloscope, to which the output of the system may be applied. A gaseous discharge tube 1 is shown having its anode connected to one terminal of the coil $L_2$ of one of the constant current networks. The grid of this gas triode is suitably biased by a tap 2 adjustable over a potentiometer 3, to a suitable negative potential. The grid of the gas triode is also connected, if desired, to a synchronizing pulse circuit comprising a condenser $C_4$ and resistor $R_3$. Although synchronization is not essential in the practice of the present invention, it is sometimes desired due to the fact that the heating of the elements of the system may change the time constants and the tuning of the constant current networks $L_1$, $C_2$ and $L_2$, $C_3$. The magnitude of the resistor $R_3$ of the synchronization circuit is made reasonably high to prevent the synchronization circuit from interacting with the grid control of the gas triode. The condenser $C_4$ is an isolating (blocking) condenser to prevent the voltage on the grid of the triode from entering the synchronization circuit, and vice versa. Returning now to the operation of the system of Fig. 3, the gas triode 1 will ionize and cause current to flow therethrough when the ungrounded terminal of the storing condenser $C_1$ reaches a particular potential, at which time the condenser $C_1$ will discharge through tube 1. The circuit constants $L_2$ and $C_3$ are so chosen that a constant current flows out of the condenser $C_1$ thus resulting in a voltage at its terminals which decreases linearly in time. The resulting voltage wave at the output terminals of the system labeled "sweep voltage" has the form of Fig. 2. The repetition rate of the triangular voltage waves or frequency may be kept constant despite temperature changes by the application of the synchronizing pulse applied to the grid of the gas triode 1 as mentioned above. The output of the system of Fig. 3 is available at the terminals marked "sweep voltage" and can be applied to suitable deflection plates on the oscilloscope. This repetition rate of the triangular wave should be a multiple of the frequency of the signal to be observed. Incidentally, it should here be noted that the coil $L_2$ of Fig. 3 may or may not have an iron core, depending upon the frequency of the sweep desired.

Although a gaseous tube has been shown used in Fig. 3, it should be understood that, if desired, other types of electron discharge devices may be employed, such as a high vacuum discharge device which might be a dynatron oscillator or a blocking oscillator or even a multivibrator oscillator.

Fig. 4 shows another embodiment of the invention which is a modification of Fig. 3, differing from Fig. 3 primarily in the use of a constant current pentode tube P, in place of the constant current network $L_1$, $C_2$ of Fig. 3. The high vacuum electron discharge device pentode P is biased in such a way by variable resistors $R_1$ and $R_6$, that its cathode current is essentially independent of the voltage applied from HT. This cathode current is used for charging the condenser $C_1$. The condenser $C_5$ in Fig. 4 is a bypass condenser, and serves to keep the signal off the screen grid of tube P. The constant current network $L_2$, $C_3$ and the gas triode circuit 1 are similar to the same numbered circuit elements of Fig. 3, and operate in substantially the same way.

Although the systems of Figs. 3 and 4 show ways of producing a triangular wave of the type shown in Fig. 2, these generator circuits are not preferred because of the following difficulties which they experience. These difficulties are caused by the use of passive networks to control the current, and are briefly (1) the constancy of the current depends upon the ability of the coil to produce extremely high voltages at resonance, and such high voltages require a very high Q circuit which is rather difficult to obtain; (2) the operation of such circuits depends upon resonance, which requires that a new circuit be used for each frequency desired; and (3) a Fourier analysis of a triangular wave reveals that there are many harmonics present and a condition of resonance for the fundamental frequency means that the currents for the harmonics are not constant, as a result of which there is a departure from linearity in the output voltage wave. The foregoing difficulties mentioned above in connection with Figs. 3 and 4 are overcome by the generator circuits of the invention of Figs. 5, 5a, 6 and 6a. These last four figures illustrate circuits which avoid the use of passive networks to control the current, and, instead of passive networks, employ electronic devices for producing constant current flow in both the charge and discharge parts of the cycle.

Fig. 5 differs from Fig. 4 in the use of a temperature limited diode 4, which replaces the constant current network $L_2$, $C_3$ of Fig. 4. It should be noted that Fig. 5 employs substantially the same constant current pentode charging circuit shown and described in connection with Fig. 4. The temperature limited diode 4 is designed to work on the saturated portion of the plate voltage-plate current curve for a particular value of cathode temperature. Preferably, a curve is selected in which the plate voltage range for constant current is rather large. The system of Fig. 5 can be employed to produce a triangular wave of isosceles configuration; that is, one in which the percentage of the period required for the charge and discharge is the same. The charging time of the triangular wave generator Fig. 5 (and this also applies to the system of Fig. 4) can be controlled within desired limits by variation of the values of the resistors $R_1$ and $R_6$.

Fig. 5a is a modificaion of Fig. 5, and differs from Fig. 5 mainly in the use of a constant current pentode tube P' to replace the temperature limited diode 4. This pentode P' is designed to function in a manner similar to the operation of constant current pentode P, and has associated therewith resistor $R_6'$, condenser $C'$, and resistor $R_1'$, which correspond to resistor $R_6$, condenser C, and resistor $R_1$ of pentode circuit P. The use of the pentode P' enables a control in percentage of the period required for the discharge. Thus, by means of the system of Fig. 5a, I am able to obtain any desired wave shape for the triangular output wave, with any desired control of the charge and discharge time of the pulse available at the sweep voltage terminals.

Fig. 6 is a generator of triangular waves, and is substantially similar to the circuit of Fig. 5, except that the positions of the temperature limited diode and the gas triode are reversed. In Fig. 6 the condenser $C_2$ is charged through the temperature limited diode 4', while the constant current pentode P'' prevents a more rapid discharge of the condenser $C_1$ through the gas triode 1 than the time of charge of this condenser. The rates of discharge in the system of Fig. 6 can be controlled by the adjustment of the resistors $R_6''$ and $R_1''$. In this way again we can obtain an unsymmetrical triangular wave.

Fig. 6a shows a triangular wave generator which differs from Fig. 6 primarily in the use of a constant current pentode P for the temperature limited diode 4' of Fig. 6. Thus, Fig. 6a employs two constant current pentodes, like Fig. 5a, but with the positions of the constant current pentodes in the discharge path on opposite sides of the gas tube 1.

The advantages of the systems of Figs. 5a and 6a over the circuits of Figs. 5 and 6 reside in the fact that the additional pentodes of Figs. 5a and 6a enable a control of the time of discharge of the condenser $C_1$ through the gas tube, through adjustment of the resistors in the circuit of the pentode in the discharge path. Also, temperature limited diodes as shown in Figs. 5 and 6 have to be operated at reduced cathode temperature which makes the device very sensitive to fluctuations in the supply voltage to the cathode heater. Hence, temperature limited diodes are to be avoided where such fluctuations are to be expected.

Figs. 7 and 8 show preferred arrangements for generating triangular pulses of the kind shown in Fig. 2a. The systems of these two figures have the advantage of being able to produce triangular pulses which are initiated by the synchronizing pulse. For this reason they are well adapted for use with the radio locating system hereinabove described, although not limited thereto.

Referring to Fig. 7 in more detail, there is shown a multivibrator or trigger circuit comprising vacuum tubes $T_1$, $T_2$, and another multivibrator or trigger circuit comprising a pair of electrode structures, included in a single evacuated envelope $T_4$. The storing or charging element comprises a condenser $C_1$, which is charged through a vacuum tube $T_3$, the latter in turn being controlled by the multivibrator circuit $T_1$, $T_2$. The condenser $C_1$ is discharged in a manner described later through the pentode electrode structure of the multivibrator $T_4$. The grids of the two multivibrator circuits are biased unsymmetrically, one grid having a negative bias applied thereto, while the other grid has an adjustable resistor connected to the ground. In each multivibrator circuit, the anode of each electrode structure is cross-coupled to the grid of the other electrode structure, so that the circuit as a whole has one degree of electrical stability. In the operation of such a multivibrator, there is a predetermined maximum anode current flow in one of the electrode structures, and a predetermined minimum anode current flow in the other electrode structure, or the reverse, the change being controlled by a pulse of desired potential applied to the grid of one of the electrode structures. Referring to the multivibrator circuit composed of tubes $T_1$ and $T_2$, the anode of $T_1$ is coupled to the signal grid of $T_2$ through resistor and condenser combination M, while the anode of $T_2$ is coupled to the grid of tube $T_1$ through a condenser $C_6$. The input circuit which provides the initiating pulse is coupled to the grid of $T_1$ through a condenser N. The tubes $T_1$ and $T_2$ are such that normally, in the absence of an initiating pulse of negative polarity, tube $T_1$ is conductive and tube $T_2$ non-conductive. The application of a negative impulse to condenser N will impress a negative pulse on the grid of tube $T_1$, which causes a change in the anode current of tube $T_1$ and simultaneously therewith a change in the anode potential of this same tube. This same change is immediately augmented by the consequent changes in the grid and anode potentials on the tube $T_2$. The reason for this follows: A decrease in the anode current of $T_1$ caused by the application of a negative potential to the grid of $T_1$, will place a positive bias on the grid of $T_2$, thus causing current to flow into $T_2$. The flow of current in $T_2$ in turn will cause a lowering of the voltage on the anode of $T_2$, as a result of which the condenser $C_6$ will be charged negatively, and the current of tube $T_1$ will be further decreased until current saturation of tube $T_2$ is reached, at which time tube $T_1$ will be non-conducting and tube $T_2$ conducting. This condition obtains as long as the negative charge remains on condenser $C_6$. The length of time the charge remains on condenser $C_6$ is determined by the adjustment of the resistor $R_7$, as well as by the value of $C_6$. If resistor $R_7$ is small, the charge on $C_6$ will leak off rapidly. As a result of the foregoing action of tube $T_1$ becoming non-conductive and tube $T_2$ becoming conducting, a condition the reverse of that previously existing, there will be a positive potential pulse on point A and a negative potential pulse on point B.

When the charge on condenser $C_6$ has leaked off, the tube $T_2$ will again become non-conducting and tube $T_1$ conducting, thus restoring the multivibrator to its original condition of stability. The value and adjustment of resistor $R_7$ will determine the time it takes tubes $T_1$ and $T_2$ to be restored to the normal condition of stability in which $T_1$ is conducting and $T_2$ non-conducting, and determines the width of the pulses available at the anodes of tubes $T_1$ and $T_2$ at points A and B, respectively. Thus, it will be seen that from an initiated pulse applied to condenser N, there are obtained two pulses of voltage, controllable in width and 180° out of phase. The time delay between initiating pulse and final saturation is determined by the rate at which the voltages at A and B can charge $C_6$, $C_m$ and the input capacitances of tubes $T_2$ and $T_1$, respectively; that is, $E_a$ must charge $T_2$ and $C_m$, while $E_b$ must charge $T_1$ and $C_6$.

The voltage pulse from tube $T_1$ is positive in sign, very steep-sided, and flat on top. This pulse is applied through the coupling condenser $C_c$ to the anode and screen grid of tube $T_3$. Normally, tube $T_3$ is non-conducting in the absence of a positive pulse applied to its anode and screen grid by tube $T_1$ over condenser $C_c$. The application of a positive pulse to the anode and screen grid of tube $T_3$ causes it to pass a current to charge the condenser $C_1$ at a constant rate. The resistors $R_8$, $R_9$ and $R_{10}$ are adjusted in such manner the tube $T_3$ charges the condenser $C_1$ at a constant rate, for the duration of the charge is, of course, controlled by the resistor $R_7$ and condenser $C_6$ in the multivibrator circuit $T_1$, $T_2$.

The multi-vibrator circuit $T_4$ operates somewhat similarly to the multivibrator circuit $T_1$, $T_2$, the former being shown as one tube rather than two tubes, merely in the interest of economy. The triode or left-hand electrode structure portion of $T_4$ is normally conducting, while the pentode or right-hand electrode structure portion of $T_4$ is normally non-conducting. During the cycle of operations of the multivibrator $T_1$, $T_2$, the negative pulse from point B on the anode circuit of tube $T_2$ supplies a negative pulse to the differentiator circuit constituted by condenser $C_{13}$, $R_{13}$. This differentiator circuit will produce from the flat topped negative pulse supplied thereto, both a sharp negative pulse and a sharp positive pulse separated by the width of the pulse from $T_2$, the negative pulse of which has no effect, but the positive pulse of which acts on the first grid of the pentode electrode structure portion of $T_4$, to cause this electrode structure to pass current. The drawing of current by the pentode section of $T_4$ will stop the current flow in the triode section of $T_4$ in a manner which will be quite apparent from what has been previously stated in connection with the multivibrator circuit $T_1$, $T_2$. Resistor $R_{11}$ is one of the elements controlling the rate of discharge of condenser $C_1$, since resistor $R_{11}$ is adjusted so that the pentode section of $T_4$ is operated as near to saturation as is possible, thus yielding an essentially constant current path, which provides a path to discharge condenser $C_1$. After a period of time determined by resistor $R_{14}$ and condenser $C_{14}$, current flow between the cathode and screen grid of the pentode section will cease, and the discharge circuit for condenser $C_1$ is then ready for the next pulse. Condenser $C_{12}$ is merely a bypass circuit. It will thus be seen that the cycle of operations of the multivibrator circuit $T_1$ and $T_2$ produces two flat top pulses, one of which controls the charging of condenser $C_1$ and the other of which controls the discharge of the condenser $C_1$ after this condenser has been charged to a desired value. The value of condenser $C_6$ and resistor $R_7$ determines the width of the flat top pulses produced by multivibrator $T_1$ and $T_2$, and hence the duration of the charge applied at a constant rate to the condenser $C_1$. The value of condenser $C_{14}$ and resistor $R_{14}$ of the multivibrator circuit $T_4$ determines the period of time of the discharge through the pentode section of $T_4$, while resistor $R_{11}$ aids in determining the rate of discharge.

The operation of Fig. 7 produces a triangular pulse, of nearly the shape shown in Fig. 2a. It has been found that departure from strict linearity on the discharge half corresponding to the return slope of the triangular wave, was tolerable, thus resulting in considerable simplification of the circuit. If strict linearity on the discharge part of the triangular pulse is desired, this can easily be obtained by the use of another constant current tube controlled by the discharge pulse from multivibrator $T_4$. Such additional constant current tube can be inserted in the connection between the condenser $C_1$ and the anode of the pentode section of $T_4$, and may, if desired, comprise a temperature limited diode of the type shown in Figs. 5 and 6. It is estimated that the circuit of Fig. 7 will produce a sweep voltage at the terminals labeled such, which starts within 0.1 to 0.05 microsecond after the leading wave front of the initiating pulse is impressed on the control grid of tube $T_1$. Although the system of this figure has been described particularly in connection with producing a series of triangular pulses of the type shown in Fig. 2a, which repeat themselves at specified and controlled intervals of time, and which occupy a time interval less than or small compared to the repetition rate, it should be understood that, if desired, this system can produce a triangular wave of the type shown in Fig. 2 by suitable adjustment of resistors $R_7$, $R_8$, $R_9$, $R_{10}$, and $R_{11}$.

Fig. 8 shows a generator of triangular waves which is more stable than that shown in Fig. 7 and is to be preferred. In Fig. 8 the functions of the multivibrator comprising tubes $T_1$ and $T_2$ are identical with the same numbered tubes in Fig. 7. The multivibrator circuit $T_4'$, $T_4''$ of Fig. 8 functions in a manner similar to the multivibrator circuit and can be said to some extent to be like that of $T_4$ of Fig. 7, except that in Fig. 8 two tubes are used. The positive pulse from tube $T_1$ of Fig. 8, however, is now applied through coupling condenser $C_c$ to a suitable gain control circuit, here shown as a resistor $R_{15}$, from which a voltage is applied to the first grid of the vacuum tube $T_3'$. It should be noted that the condenser $C_1$ is here charged through the tube $T_3'$, the charging current for this condenser being supplied by the high voltage source HT, instead of from tube $T_1$, as in Fig. 7. The advantage of this particular arrangement is that the system is made less sensitive to variation in tube characteristics. The multivibrator circuit comprising tubes $T_4'$, $T_4''$ assumes the function of $T_4$ in Fig. 7, but the two power tubes of Fig. 8 give a more rapidly acting discharge circuit, which is preferred in a system suitable for use in connection with a radio locating circuit. The condenser $C_1$ of Fig. 8 discharges through resistor $R_{16}$ and the right-hand pentode $T_4''$. By varying the value of resistor $R_{16}$, we are able to obtain a change in the rate of discharge of the condenser $C_1$. The remarks mentioned above in connection with the linearity of the discharge circuit of Fig. 7 apply equally well for the circuit shown in Fig. 8.

Fig. 9 shows, schematically and partially in block form, a circuit for using the pulse-initiated triangular wave generator. The initiating pulse arriving from a radio locating pulser makes the generator 100 start through its cycle of operation producing a triangular pulse at the output terminals Z of the generator. This pulse is applied to one sweeping plate of the cathode ray tube and load resistor $R_1$ through a suitable blocking condenser $C_1$. Since the sweep voltage is produced with reference to ground, and since the other sweeping plate of the oscillograph is sensibly grounded through resistor $R_2$ ($R_2$ may be zero), the cathode ray is deflected across the fluorescent screen of the tube CRO. Any echo signals to be received are impressed on signal plate 1 of CRO while the spot is moving away from its rest position by means of the video amplifier shown (or other device) through blocking condenser $C_2$ and load resistor $R_3$. When the spot has reversed its motion and is returning toward its rest position, the marking device, which is phased with respect to the video circuit or initiating pulse (as shown), in order to prevent its operation during reception of a signal pulse, then impresses the marking pulse on load resistor $R_4$ and signal plate 2.

It should be distinctly understood that the triangular wave or triangular pulse generators of the invention described above in connection with Figs. 3 to 8, inclusive, may have wide application and are not limited to use in radio locating apparatus, herein given above by way of example as one application. As an illustration, the sweep signal of the invention may be used in television and in facsimile systems, in which case it would be possible to obtain a substantial increase in the number of lines over presently used systems without increase of frequency band, because the time of retrace can be made very nearly zero, and practically all the necessary signals which are normally transmitted and received during the retrace time in presently used systems (about 10%) can be sent either superimposed or in 0.1% of the time. The terms "wave" or "wave form" in the appended claim are intended to apply to the non-sinusoidal variations of Figs. 2 and 2A.

Having now described the invention, what is claimed and desired to be secured by Letters Patent is the following:

A generator of non-sinusoidal waves comprising a charge storage element, a multivibrator circuit having one degree of freedom for producing flat top pulses in response to an input pulse, a constant current circuit connected between said storage element and one point on said multivibrator circuit at which said flat top pulses are adapted to appear, and another multivibrator circuit connected effectively in series with said storage element for discharging said storage element at a substantially uniform rate, said last multivibrator circuit having an adjustable element associated therewith for controlling the rate of discharge.

WILLIAM A. MILLER.

REFERENCES CITED

The following references are of record in the file of this patent:

UNITED STATES PATENTS

| Number | Name | Date |
|---|---|---|
| 2,052,183 | Lewis | Aug. 25, 1936 |
| 2,052,184 | Lewis | Aug. 25, 1936 |
| 2,097,400 | Batchelor | Oct. 26, 1937 |
| 2,114,938 | Puckle | Apr. 19, 1938 |
| 2,129,036 | Schlesinger | Sept. 6, 1938 |
| 2,148,096 | Banks | Feb. 21, 1939 |
| 2,172,746 | Young | Sept. 12, 1939 |
| 2,180,364 | Norton | Nov. 21, 1939 |
| 2,244,003 | Eaglesfield | June 3, 1941 |
| 2,250,686 | Urtel | July 29, 1941 |
| 2,251,851 | Moore | Aug. 5, 1941 |
| 2,265,996 | Blumlein | Dec. 16, 1941 |
| 2,368,448 | Cook | Jan. 30, 1945 |

FOREIGN PATENTS

| Number | Country | Date |
|---|---|---|
| 834,082 | France | Aug. 1, 1938 |